(12) United States Patent
Drange

(10) Patent No.: US 11,269,112 B2
(45) Date of Patent: Mar. 8, 2022

(54) CALIBRATION BASED ON TWIST AND ORIENTATION FOR A TOWED OBJECT

(71) Applicant: PGS Geophysical AS, Oslo (NO)

(72) Inventor: Geir Andre Motzfeldt Drange, Oslo (NO)

(73) Assignee: PGS Geophysical AS, Oslo (NO)

( * ) Notice: Subject to any disclaimer, the term of this patent is extended or adjusted under 35 U.S.C. 154(b) by 983 days.

(21) Appl. No.: 15/966,073

(22) Filed: Apr. 30, 2018

(65) Prior Publication Data

US 2018/0321420 A1    Nov. 8, 2018

Related U.S. Application Data

(60) Provisional application No. 62/502,194, filed on May 5, 2017.

(51) Int. Cl.
*G01V 13/00* (2006.01)
*G01V 1/38* (2006.01)

(52) U.S. Cl.
CPC ............ *G01V 13/00* (2013.01); *G01V 1/3817* (2013.01); *G01V 1/3826* (2013.01); *G01V 1/3835* (2013.01)

(58) Field of Classification Search
USPC .......................................................... 367/19
See application file for complete search history.

(56) References Cited

U.S. PATENT DOCUMENTS

| | | | |
|---|---|---|---|
| 6,205,403 B1 | 3/2001 | Gaiser et al. | |
| 6,550,323 B1* | 4/2003 | Nguyen | G01N 3/34 73/158 |
| 9,322,942 B2 | 4/2016 | Mellier et al. | |
| 9,874,647 B2 | 1/2018 | Südow et al. | |
| 2008/0151688 A1 | 6/2008 | Goujon | |
| 2011/0310698 A1 | 12/2011 | Maples et al. | |
| 2014/0029377 A1* | 1/2014 | Mellier | G01V 1/00 367/13 |
| 2015/0016216 A1 | 1/2015 | Südow et al. | |
| 2015/0063063 A1* | 3/2015 | Sudow | G01V 1/201 367/16 |
| 2015/0153469 A1 | 6/2015 | Sudow et al. | |
| 2015/0222511 A1* | 8/2015 | Fertner | H04L 43/0864 370/252 |
| 2016/0063063 A1 | 3/2016 | Tsai | |
| 2016/0313366 A1 | 10/2016 | Sudow et al. | |
| 2018/0143335 A1* | 5/2018 | Sudow | G01V 1/20 |

OTHER PUBLICATIONS

Extended EP Search Report for related EP Application 18170852.0, dated Oct. 29, 2018 (9 pgs).

* cited by examiner

Primary Examiner — James R Hulka

(57) ABSTRACT

Calibration based on twist and orientation for towed object can include determining an amount of twist as a function of length of a portion of a towed object based on output of tilt sensors in the portion of the towed object and a model that describes the twist along the portion of the towed object. An orientation of a seismic sensor can be determined based on the determined amount of twist and a position of the seismic sensor along a length of the portion of the towed object. The seismic sensor can be calibrated based on the orientation.

24 Claims, 6 Drawing Sheets

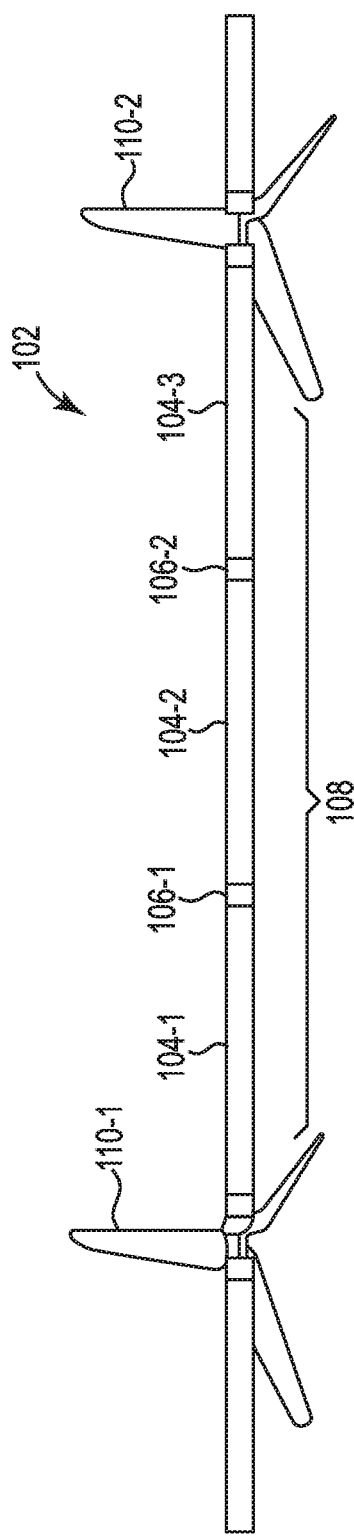
Fig. 1
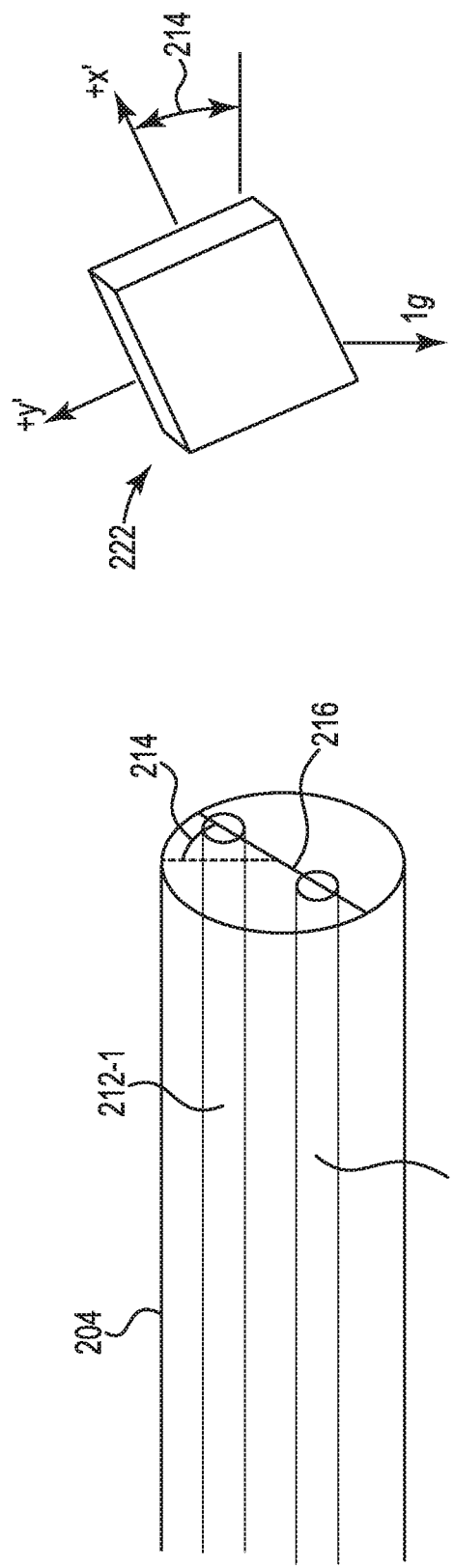
Fig. 2A
Fig. 2B

CALIBRATION BASED ON TWIST AND ORIENTATION FOR A TOWED OBJECT

CROSS-REFERENCE TO RELATED APPLICATIONS

This application claims priority to U.S. Provisional Application 62/502,194, filed May 5, 2017, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the water surface and over a subterranean formation to be surveyed for mineral deposits. Sensors may be located on or near the seafloor, on one or more streamers towed by the marine survey vessel, or on one or more streamers towed by another vessel. The marine survey vessel typically contains marine survey equipment, such as navigation control, source control, sensor control, and recording equipment. The source control may cause the one or more sources, which can be air guns, marine vibrators, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The sensors thereby measure a wavefield that was initiated by the actuation of the source.

BRIEF DESCRIPTION OF THE DRAWINGS

FIG. 1 illustrates a side view of an example of a portion of a towed object.

FIG. 2A illustrates a perspective cutaway view of a portion of an example of a towed object.

FIG. 2B illustrates a schematic representing an example of the output of a tilt sensor.

DETAILED DESCRIPTION

Figure 4:
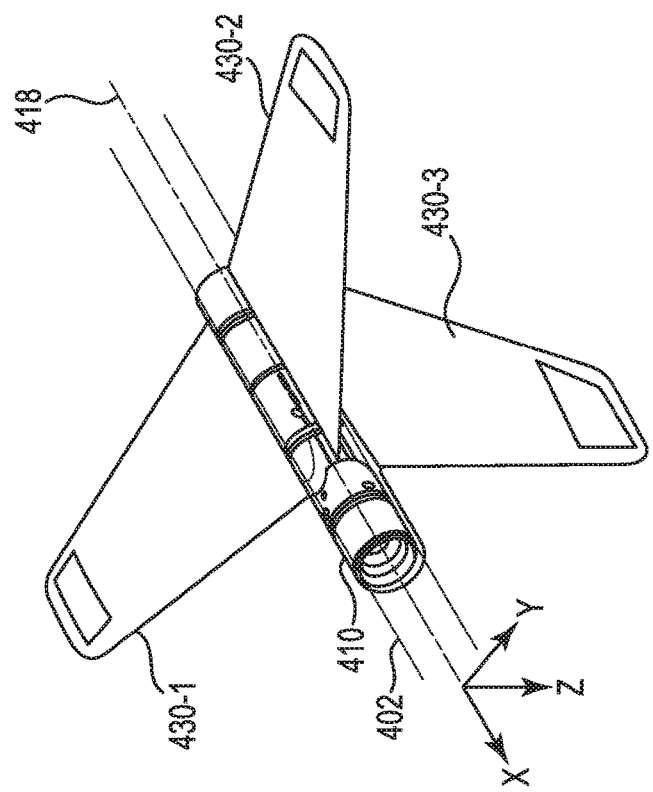
FIG. 4 illustrates a perspective view of an example of a steering device of a towed object.

This disclosure is related generally to the field of marine surveying. Marine surveying can include, for example, seismic surveying or electromagnetic surveying, among others. During marine surveying, one or more sources are used to generate wavefields, and sensors (towed and/or ocean bottom) receive energy generated by the sources and affected by the interaction with a subsurface formation. The sensors thereby collect survey data, which can be useful in the discovery and/or extraction of hydrocarbons from subsurface formations.

A towed object, such as a source, a sensor, or a streamer, may be towed behind a marine survey vessel to collect the survey data. A streamer can be a marine cable assembly that can include sensors and electrical or optical connections to transmit information collected by the sensors to the marine survey vessel. The streamer can include sensors such as seismic sensors (e.g., hydrophones, geophones, etc.) or electromagnetic sensors that are configured to receive signals generated by sources. The streamer can include sensors such as tilt sensors, magnetometers, accelerometers, and gyroscopes that are configured to sense environmental conditions or signals generated by sources. The sensors can be digitized and the data generated by the sensors can be transmitted to a controller on a marine survey vessel through streamer telemetry, such as fiber, copper, or wireless signals. Some sensors may not have a direct current (DC) frequency response or another means of determining their orientation. In some previous approaches, sensors may have been gimballed to vertically self-align.

In contrast, according to at least one embodiment of the present disclosure, gimballing of sensors is not necessary. For such sensors, a secondary sensor, such as a tilt sensor, can be used to determine their orientation. At least one embodiment of the present disclosure can include determining an amount of twist as a function of length of a portion of a towed object based on output of tilt sensors in the portion of the towed object and a model that describes the twist along the portion of the towed object. An orientation of a seismic sensor can be determined based on the determined amount of twist and a position of the seismic sensor along a length of the portion of the towed object. The seismic sensor can be calibrated based on the orientation. Calibration of the seismic sensor based on the orientation can help the seismic sensor distinguish between up and down movement or signals and sideways movement or signals that it may not otherwise be able to distinguish without a proper reference to gravity such as a DC frequency response.

As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3. Multiple analogous elements within one figure may be referenced with a reference numeral followed by a hyphen and another numeral or a letter. For example, 110-1 may reference element 10-1 in FIGS. 1 and 110-2 may reference element 10-2, which can be analogous to element 10-1. Such analogous elements may be generally referenced without the hyphen and extra numeral or letter. For example, elements 110-1 and 110-2 may be generally referenced as 110. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates a side view of a portion 108 of an example of a towed object 102. A towed object 102 can be any object towed by a marine vessel such as a marine survey vessel. Examples of towed objects 102 include a source, a sensor, or a streamer. In the embodiment illustrated in FIG. 1, the towed object 102 is depicted as a portion 108 of a streamer including a plurality of sections 104-1, 104-2, 104-3. Although the towed object 102 is illustrated with three sections 104, more or fewer sections can be included with a towed object. The sections 104 can include sensors such as hydrophones, geophones, accelerometers, etc. The sections 104 of the portion 108 of the towed object 102 are interconnected with connectors 106-1, 106-2. Each end of the portion 108 of the towed object 102 is connected to a respective steering device 110-1, 110-2. A steering device 110 can include a plurality of wings as illustrated in more detail in FIG. 4. The steering devices 110 can provide depth control, lateral control, and rotational control of the towed object 102. The steering devices 110 can rotate the towed object 102 along its longitudinal axis or generally along an axis parallel to a direction in which the towed object is towed. In at least one embodiment, a streamer can have sections 104 that are between 75 and 150 meters long, where the total streamer length is ten kilometers or more. By way of example, the distance between steering devices 110 can be 300 meters. However, embodiments are not limited to a particular distance between steering devices.

FIG. 2A illustrates a perspective cutaway view of a portion of an example of a towed object. More specifically, the cutaway includes a section 204 of the towed object with two stress members 212-1, 212-2 internal to the section 204. A stress member is an elongate body within a towed object, such as a streamer, that can alleviate and/or distribute movement that would be caused by a mechanical load on the towed object. Examples of stress members include rope (such as synthetic rope made from nylon, Kevlar, etc.), metallic cable, and elastic bands, among others. Although not specifically illustrated, stress member terminations can hold stress members together across different sections of the towed object and be partially and/or fully enclosed and/or housed within the section of the towed object. For example, the stress member terminations can be part of the connectors 106 illustrated in FIG. 1. Stress can be transferred from the stress members 212 to the connector and via the connector and stress member termination of an opposing connector to the stress members in the next section.

The rotational angle 214 of the towed object is dynamic and may be different at different locations along the towed object. The rotation angle 214 can be measured relative to a plane 216 formed by the stress members 212. The change in rotation angle 214 per unit length of the towed object can be measured in degrees per length. The change in rotation angle 214 per unit length is also referred to herein as twist.

Figure 3:
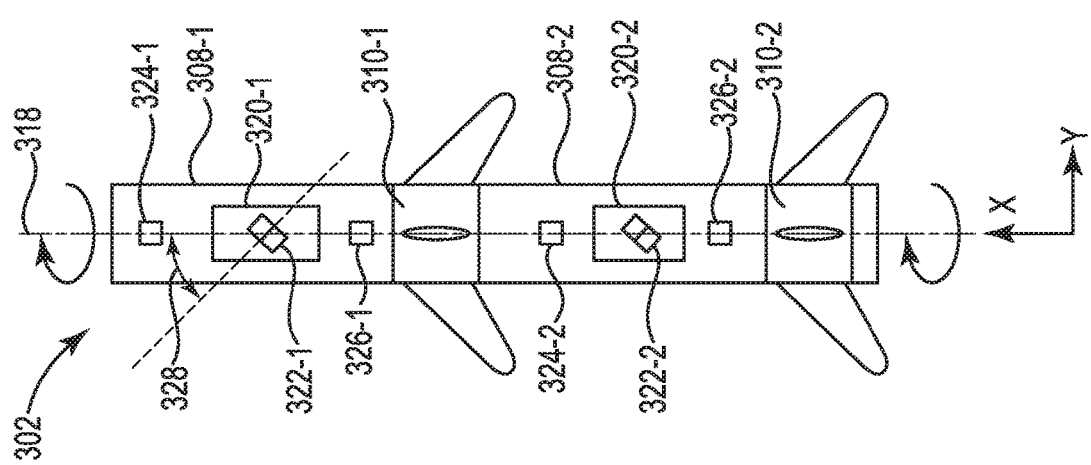
FIG. 3 illustrates a bottom view of various portions of an example of a towed object.

FIG. 2B illustrates a schematic representing the output of an example of a tilt sensor 222. As illustrated in FIG. 3, the tilt sensor can be fixed in a telemetry unit in a section of a towed object. The tilt sensor 222 can include two or three accelerometers that can measure gravity, which is illustrated in FIG. 2B as "1 g". A tilt sensor 222 including two accelerometers can be referred to as a 2-axis tilt sensor. A tilt sensor 222 including three accelerometers can be referred to as a three-axis tilt sensor. In FIG. 2B, "+x'" represents the positive direction along an x' axis and "+y'" represents the positive direction along a y' axis. The x' and y' axes are reference axes from the perspective of the tilt sensor 222, as opposed to axes of an object, such as a towed object, in which the tilt sensor is mounted. In other words, the x' and y's axes represent uncalibrated axes for the tilt sensor 222. The x' axis can be an axis along which a first accelerometer of the tilt sensor is oriented and the y' axis can be an axis along which a second accelerometer of the tilt sensor is oriented. The rotation angle (θ) 214, which is also referred to herein as the output of the tilt sensor 222, can be defined as:

$$\theta = \tan^{-1}\left(\frac{A_{x,out}}{A_{y,out}}\right),$$

where $A_{x,\,out}$ is the output of the accelerometer oriented along the x' axis and $A_{y,\,out}$ is the output of the accelerometer oriented in the y' axis.

FIG. 3 illustrates a bottom view of various portions 308 of an example of a towed object 302. A longitudinal axis 318 of the towed object 302 is illustrated as being aligned with a direction along the x-axis in which the towed object is being towed. A first steering device 310-1 is coupled to a first portion 308-1 and a second steering device 310-2 is coupled to a second portion 308-2. As illustrated, the first steering device 310-1 may be said to be coupled to both the first portion 308-1 and the second portion 308-2, however embodiments are not so limited as there may be other portions of the towed object 302 between the first steering device 310-1 and the second steering device 310-2. The first portion 308-1 is illustrated as including seismic sensors such as a first piezoelectric accelerometer 324-1 and a first geophone 326-1. The second portion 308-2 is illustrated as including seismic sensors such as a second piezoelectric accelerometer 324-2 and a second geophone 326-2.

The first portion 308-1 is illustrated as including a first towed object telemetry unit 320-1 mounted thereto. The second portion 308-2 is illustrated as including a second towed object telemetry unit 320-2 mounted thereto. Although FIG. 3 illustrates portions 308 of the towed object 302 generally without separately illustrating sections (illustrated as sections 104 in FIG. 1) of the towed object 302, in at least one embodiment of the present disclosure, different sections of the towed object 302 can include different telemetry units 320. The towed object telemetry units 320 can be circuit boards. The first towed object telemetry unit 320-1 includes a first tilt sensor 322-1. The second towed object telemetry unit 320-2 includes a second tilt sensor 322-2.

The tilt sensors 322 can be mounted in the towed object 302 along a fixed reference, such as in the plane formed by the stress members (illustrated as plane 216 in FIG. 2A). Although only one tilt sensor 322 is illustrated in each portion 308 of the towed object 302, each portion 308 can include a plurality of tilt sensors. Furthermore, each section (illustrated as sections 104 in FIG. 1) can include one or more tilt sensors. The spacing between tilt sensors 322 within a section or portion 308 of the towed object 302 can be uniform or varying. Although the tilt sensors 322 are illustrated in association with other sensors on the telemetry units 320, embodiments are not so limited. The tilt sensors 322 can be located anywhere, independent of the locations of other sensors. The longest distance (D) between two tilt sensors 322 determines the maximum amount of twist that can be measured without aliasing:

$$\text{Max twist} = \frac{360°}{D}(°\text{m}^{-1}),$$

where "m" is distance in meters.

The first tilt sensor 322-1 has a mounting angle offset 328 from a longitudinal axis of the towed object telemetry unit, which may generally align with the longitudinal axis 318 of the towed object 302. The longitudinal axis 318 of the towed object 302 can generally align with a direction in which the towed object is towed. The mounting angle offset 328 can aid in producing meaningful data in three dimensions during a rotation about the longitudinal axis 318. If the mounting angle offset 328 were zero (if the first tilt sensor 322-1 was aligned with the longitudinal axis 318) then a roll about the longitudinal axis 318 would only produce data in two dimensions. In at least one embodiment the mounting angle offset 328 is 45 degrees, however embodiments are not limited to a particular mounting angle offset 328. The tilt sensors 324 can be digital linear acceleration sensors. The tilt sensors 324 can be a tri-axis microelectromechanical system (MEMS).

The towed object 302 can be rotated using the steering devices 310. For example, the wings of the steering devices 310 can be adjusted to cause the towed object 302 to rotate. In at least one embodiment, the entire towed object 302 or multiple portions 308 of the towed object 302 can be rotated along the longitudinal axis 318 using a plurality of the steering devices 310. Rotating the towed object 302 can be useful for performing calibration of various sensors associated with the towed object 302. Collective untwisting of the entire towed object 302 can be used for relatively shorter towed objects, for example, as compared to streamers. In at least one embodiment, the towed object 302 can be untwisted on a portion-by-portion basis. For example, the first portion 308-1 can be untwisted by operation of the first steering device 310-1 and/or by operation of another steering device forward of the first portion 308-1. The second portion 308-2 can be untwisted by operation of the second steering device 310-2 and/or by operation of the first steering device 310-1. Such embodiments can be beneficial particularly for longer towed objects 302, such as streamers, where it may be impractical to untwist the entire towed object 302 collectively with a fine degree of control over the twist. The twist of the towed object 302, or a portion 308 thereof, in any particular heading can include a single twist in a single direction, or multiple twists in one or more directions. The direction of the twist can be clockwise or counterclockwise along the longitudinal axis 318 of the towed object 302.

The portions 308 of the towed object 302 are under tension when being towed by a marine survey vessel. A model can describe the twist along a portion 308 of the towed object 302 between any two steering devices 310. For example, the model can be linear when the amount of twist along a portion 308 of the towed object 302 is constant. Other models can be non-linear when the amount of twist along the portion 308 of the towed object is not constant. The steering devices 310 can be actuated to cause the towed object 302 to untwist. In at least one embodiment, the steering devices 310 can be actuated by a controller to cause the towed object 302 to untwist according to a predefined model.

FIG. 4 illustrates a perspective view of an example of a steering device 410 of a towed object 402. The steering device 410 can include a central portion that can be attached to a towed object 402 in line with a longitudinal axis 418 of the towed object 402 along the x-axis. The z-axis generally indicates depth, for example toward the surface of the earth. The orientation of the axes illustrated in FIG. 4 is analogous to that illustrated in FIG. 3 and FIG. 10. The steering device 410 can include a plurality of wings 430 extending from the central portion. The embodiment illustrated in FIG. 4 includes three wings 430-1, 430-2, 430-3 attached to the central portion of the steering device 410, however embodiments are not limited to steering devices 410 including three wings 430 as the steering devices 410 can include more or fewer wings 430. The wings 430 can then be adjusted to generate a force, such as a lifting force or lateral steering force and/or to generate a torque. Adjustment of the wings 430 can include rotation of the wings 430 or control surfaces thereon.

In at least one embodiment, the wings 430 can be rotatably coupled to the central portion of the steering device 410 such that they can rotate. While being towed, for example along the longitudinal axis 418, rotation of the wings 430 can cause a force to be applied to the central portion of the steering device 410 and thus to the towed object 402. In at least one embodiment, the wings 430 can be fixedly coupled to the central portion of the steering device 410 such that they cannot rotate with respect to the central portion. For embodiments in which the wings 430 are fixedly coupled to the central portion, each wing 430 can include one or more control surfaces (a portion of the wing 430) that can pivot in relation to a remainder of the wing 430 analogously to an aileron. While being towed, movement of the control surface can apply a force to the central portion of the steering device 410 and thus to the towed object 402. By way of example, the first wing 430-1 and the second wing 430-2 can function as ailerons and elevators for the steering device 410, controlling pitch about the y-axis and roll about the x-axis or longitudinal axis 418, while the third wing 430-3 can function as a rudder, controlling yaw of the steering device 410 about the z-axis. However, all three wings 430-1, 430-2, 430-3 can be operated collectively to cause the steering device 410 to roll about the x-axis or longitudinal axis 418. For example, while being towed, the wings 430-1, 430-2, 430-3, or the control surfaces thereon, can all be deflected in a same direction to cause the steering device 410 to roll.

Figure 5:
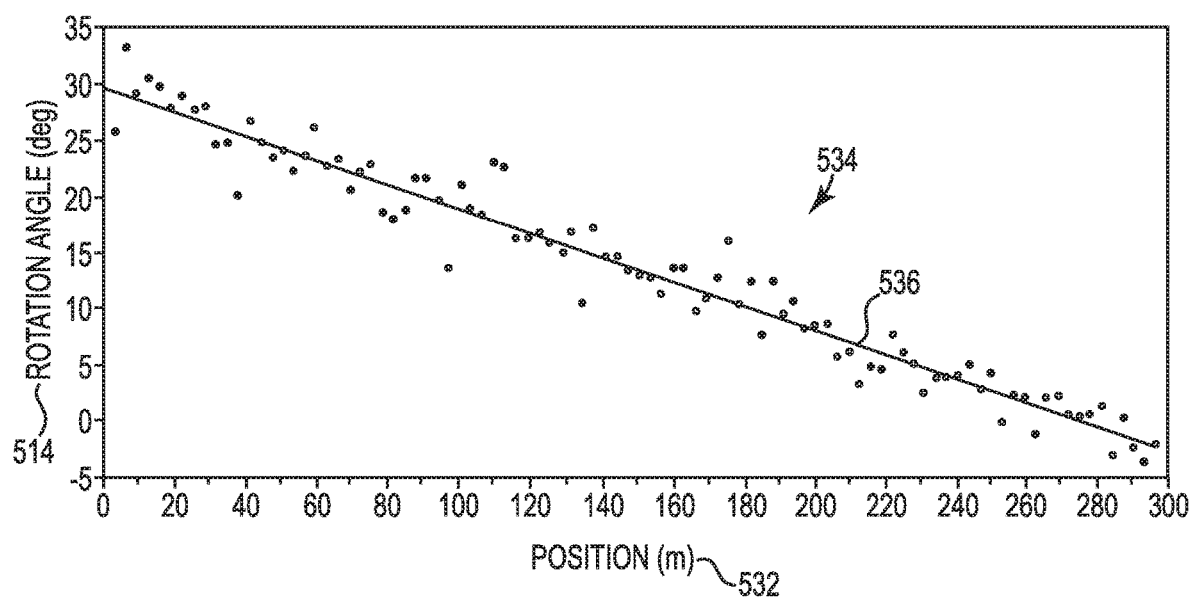
FIG. 5 illustrates a graph of rotation angle versus position for a plurality of examples of tilt sensors.

FIG. 5 illustrates a graph of rotation angle 514 versus position 532 for a plurality of examples of tilt sensors. The output 534 of a tilt sensor can be the rotation angle 514 of the tilt sensor. However, the output 534 of the tilt sensors can have errors. The errors can be from mounting errors, digitization errors, and motion errors. The mounting errors can occur if the tilt sensor is not mounted perfectly with respect to the fixed reference or if the telemetry unit to which the tilt sensor is coupled is not mounted perfectly with respect to the fixed reference. Digitization errors can also be referred to as quantization errors or round-off errors in the digital value output of the tilt sensor. Motion errors can be caused by acceleration of the towed object. The error in the output 534 of the tilt sensor may also be referred to as noise or analogized to noise. The orientation of a tilt sensor is the rotation angle 514 of the tilt sensor without error. The rotation angle 514 of the tilt sensor without error is the rotation angle with proper respect to a reference. A particular tilt sensor that has an error in its output can be calibrated with the orientation of the tilt sensor to correct for the error.

In FIG. 5, the output 534 of a plurality of tilt sensors associated with a towed object is plotted as rotation angle 514 versus position 532. The position 532 of the tilt sensors can be known based on where the tilt sensors are mounted along the towed object. The example illustrated in FIG. 5 shows the output 534 of tilt sensors positioned on the towed object between 0 meters and 300 meters. In can be safely assumed that the towed object is not contorted as the plot in FIG. 5 would suggest based on the raw output 534, which may be due to the errors described above. Rather, the twist of the towed object is likely to be much smoother along a length of the towed object. Therefore the output 534 of the tilt sensors can be calibrated to provide a more accurate result.

If interpolation were used to calibrate the output 534 of the tilt sensors, the errors would likely be amplified by the interpolation. In contrast, according to at least one embodiment of the present disclosure, a regression analysis can be used to calibrate the output 534 of the tilt sensors. The regression analysis can be used to estimate the orientation of the towed object between any two steering devices. When the model that describes the twist along the portion of the towed object is linear, a linear regression can be used. When the model that describes the twist is non-linear, a non-linear regression can be used. The example illustrated in FIG. 5 shows a linear model that can be used for the regression analysis to determine an amount of twist along the portion of the towed object.

The result 536 of the regression analysis describes the orientation of the portion of the towed object as a function of length and can be used to determine the orientation of any sensor or sensor group within the portion of the towed object. For example with respect to FIG. 5, a seismic sensor having a position of 185 meters along a length of the portion of the towed object can be determined to have an orientation of 10 degrees according to the result 536 of the regression analysis. Likewise, a particular tilt sensor having a position of 185 meters along the length of the portion of the towed object can be determined to have an orientation of 10 degrees despite the output 534 of the particular tilt sensor indicating a rotation angle of 8 degrees. The particular tilt sensor can be calibrated based on the orientation. For example, the particular tilt sensor can be calibrated such that the output of the particular tilt sensor is 10 degrees rather than 8 degrees. The result 536 can significantly reduce errors in the output 534 of individual tilt sensors. The result 536 can also help account for tilt sensors that do not provide an output 534, such as faulty tilt sensors or tilt sensors that are having communication issues. In at least one embodiment of the present disclosure, a separate model can be made for each portion of the towed object.

In at least one embodiment, the type of model to be used, such as linear or non-linear, can be determined based on the output 534. For example, if the output 534 appears to follow a linear trend, then a linear model can be used. If the output 534 appears to follow a non-linear trend, then a non-linear model can be used.

Figure 6:
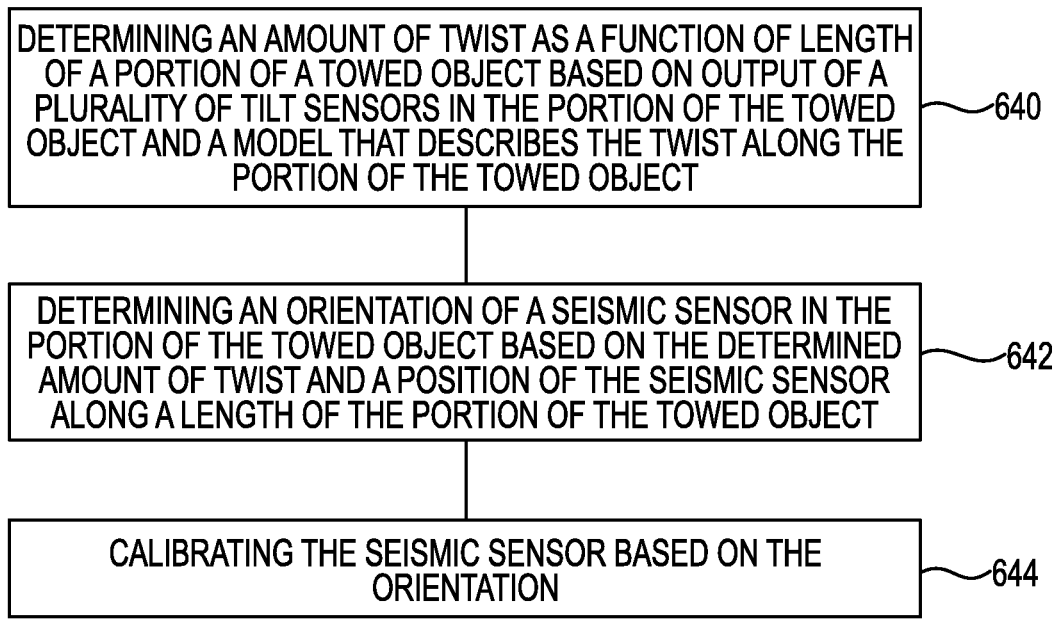
FIG. 6 illustrates a method flow diagram for an example of calibration based on twist and orientation for a towed object.

FIG. 6 illustrates a method flow diagram for an example of calibration based on twist and orientation for a towed object. In at least one embodiment, the method can be performed by a controller, such as the controller 954 illustrated in FIG. 9. At block 640, the method can include determining an amount of twist as a function of length of a portion of a towed object based on output of a plurality of tilt sensors in the portion of the towed object and a model that describes the twist along the portion of the towed object. The amount of twist can be determined by performing a regression analysis on the output of the plurality of tilt sensors corresponding to the model. For example, the regression analysis can be performed as described with respect to FIG. 5. In response to the model comprising a linear model, a linear regression analysis can be performed. In response to the model comprising a non-linear model, a non-linear regression analysis can be performed. The amount of twist can further be determined based on a respective position of each of the plurality of tilt sensors along the length of the towed object, which can be input to the regression analysis.

Although not specifically illustrated in FIG. 6, the method can further include determining an amount of twist as a function of length of each of a different portion (or of a plurality of portions) of the towed object based on output of a respective plurality of tilt sensors in the different portion (or in each of the plurality of portions) of the towed object and the model that describes the twist along the different portion (or along the respective portions) of the towed object.

A respective orientation of each of the plurality of tilt sensors can be determined based on the determined amount of twist and a respective position of each of the plurality of tilt sensors along the length of the portion of the towed object. The positions of the tilt sensors can be known.

At block 642, the method can include determining an orientation of a seismic sensor in the portion of the towed object based on the determined amount of twist and a position of the seismic sensor along a length of the portion of the towed object. At block 644, the method can include calibrating the seismic sensor based on the orientation. Calibrating the seismic sensor corrects its output such that it is in a world frame of reference rather than in an arbitrary or uncalibrated frame of reference. Using FIG. 2B as an example, where x' and y' are reference axes of the tilt sensor 222, and the tilt sensor 222 represents the seismic sensor being calibrated in this example, the output would be corrected such that the reference y' axis was in-line with gravity ("1 g" as illustrated in FIG. 2B). As described herein, such calibration can allow the seismic sensor to provide data that is already corrected for a world frame of reference without the seismic sensor being gimballed in the towed object.

Figure 7:
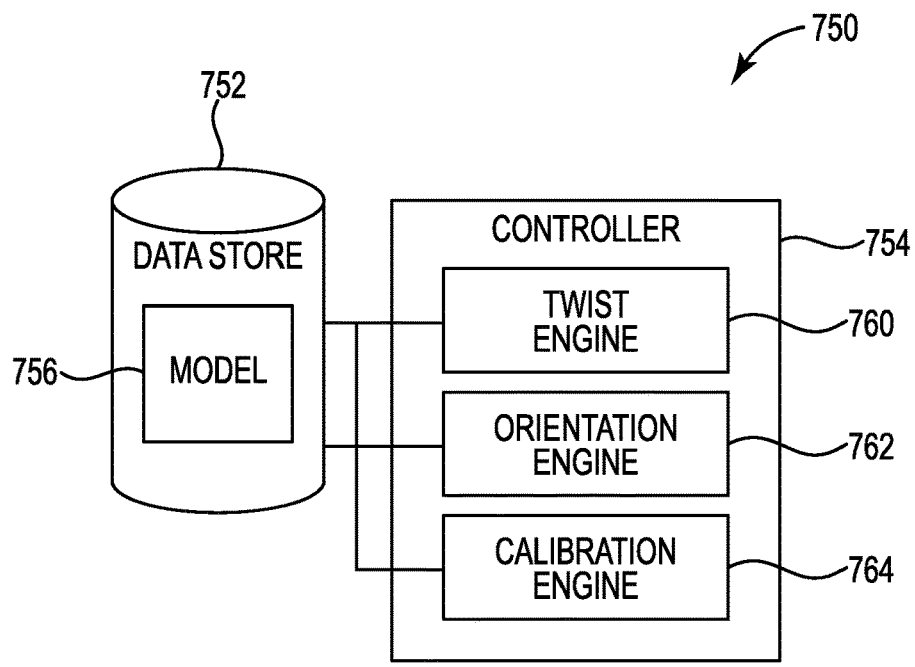
FIG. 7 illustrates a diagram of an example of a system for calibration based on twist and orientation for a towed object.

FIG. 7 illustrates a diagram of an example of a system 750 for calibration based on twist and orientation for a towed object. The system 750 can include a data store 752, and a controller 754. The data store 752 can store a model 756 that describes twist along a portion of a towed object or a plurality of different models 756 that each describes a different twist along the portion of a towed object. The controller 754 can include engines, such as a twist engine 760, an orientation engine 762, and a calibration engine 764. The controller 754 and engines can be in communication with the data store 752 via a communication link. The system 750 can include additional or fewer engines than illustrated to perform the various functions described herein. The system can represent program instructions and/or hardware of a machine such as the machine 854 referenced in FIG. 8, etc. As used herein, an "engine" can include program instructions and/or hardware, but at least includes hardware. Hardware is a physical component of a machine that enables it to perform a function. Examples of hardware can include a processing resource, a memory resource, a logic gate, etc.

The engines can include a combination of hardware and program instructions that is configured to perform functions described herein. The program instructions, such as software, firmware, etc., can be stored in a memory resource such as a machine-readable medium, etc., as well as hard-wired program such as logic. Hard-wired program instructions can be considered as both program instructions and hardware.

Although not specifically illustrated, the controller 754 can be coupled to a streamer including a plurality of portions, to a first steering device coupled to a first end of a particular portion, and to a second steering device coupled to a second end of the particular portion. The particular portion can include a plurality of tilt sensors coupled thereto. The particular portion can also include a seismic sensor coupled thereto, such as a geophone that is not gimballed. In at least one embodiment, the plurality of tilt sensors and/or the seismic sensor can be coupled to the particular portion along a fixed reference. The plurality of tilt sensors can be coupled to the particular portion at uniform or non-uniform intervals.

In at least one embodiment, each portion of the streamer can include a respective plurality of tilt sensors coupled thereto. A respective first steering device can be coupled to the controller and to a respective first end of each of the plurality of portions and a respective second steering device can be coupled to the controller and to a respective second end of each of the plurality of portions.

Although not specifically illustrated, the controller can include an actuation engine comprising a combination of hardware and program instructions that is configured to actuate the first and the second steering devices to cause the particular portion (or the entire streamer) to untwist according to the model 756 (or any of the plurality of models 756) that describes twist along the particular portion (or any of the portions). The controller 754 can be configured to receive output of the tilt sensors. The actuation engine can be configured to actuate the first and the second steering devices to cause the particular portion to rotate to calibrate the plurality of tilt sensors.

The twist engine 760 can include a combination of hardware and program instructions that is configured to determine an amount of twist as a function of length of the particular portion (or of each portion) based on the output and the model. The orientation engine 762 can include a combination of hardware and program instructions that is configured to determine an orientation of the seismic sensor based on a position of the seismic sensor along a length of the particular portion and the determined amount of twist. The orientation engine 762 can be configured to determine an orientation of each of the tilt sensors based on the determined amount of twist. The calibration engine 764 can include a combination of hardware and program instructions that is configured to calibrate the seismic sensor based on the orientation. The calibration engine 764 can be configured to calibrate each of the tilt sensors based on the orientation.

Figure 8:
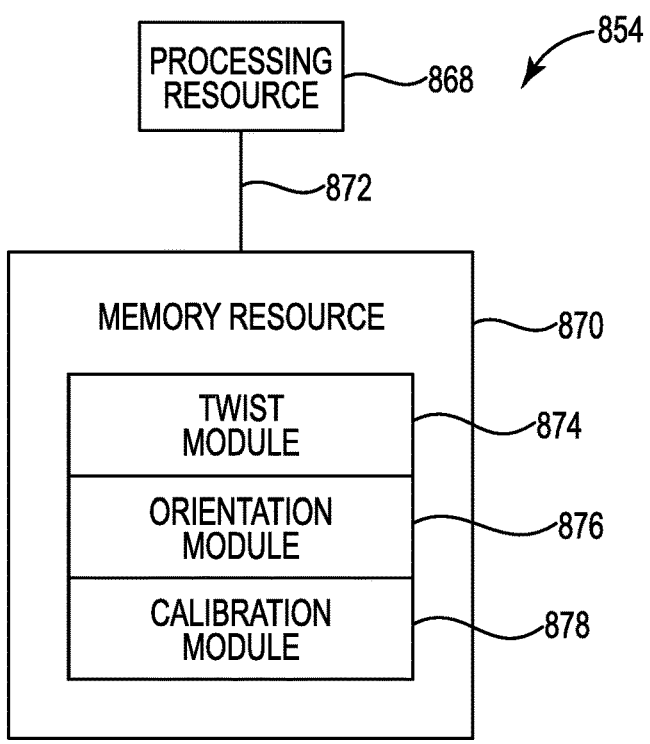
FIG. 8 illustrates a diagram of an example of a machine for calibration based on twist and orientation for a towed object.

FIG. 8 illustrates a diagram of an example of a machine 854 for calibration based on twist and orientation for a towed object. The machine 854 can utilize software, hardware, firmware, and/or logic to perform functions. The machine 854 can be a combination of hardware and program instructions configured to perform functions. The machine 854 is also generally referred to herein as a controller, which is analogous to the controller 954 illustrated in FIG. 9. The hardware, for example, can include processing resources 868 and memory resources 870, such as a machine-readable medium or other non-transitory memory resources 870. The memory resources 870 can be internal and/or external to the machine 854. For example, the machine 854 can include internal memory resources and have access to external memory resources. The program instructions, such as machine-readable instructions, can include instructions stored on the machine-readable medium to implement a particular function, for example, an action such as calibrating a seismic sensor based on twist and orientation. The set of machine-readable instructions can be executable by one or more of the processing resources 868. The memory resources 870 can be coupled to the machine 854 in a wired and/or wireless manner. For example, the memory resources 870 can be an internal memory, a portable memory, a portable disk, or a memory associated with another resource, for example, enabling machine-readable instructions to be transferred or executed across a network such as the Internet. As used herein, a "module" can include program instructions and/or hardware, but at least includes program instructions.

Memory resources 870 can be non-transitory and can include volatile and/or non-volatile memory. Volatile memory can include memory that depends upon power to store data, such as various types of dynamic random access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and a solid state drive, etc., as well as other types of non-transitory machine-readable media.

The processing resources 868 can be coupled to the memory resources 870 via a communication path 872. The communication path 872 can be local or remote to the machine 854. Examples of a local communication path 872 can include an electronic bus internal to a machine, where the memory resources 870 are in communication with the processing resources 868 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 872 can be such that the memory resources 870 are remote from the processing resources 868, such as in a network connection between the memory resources 870 and the processing resources 868. That is, the communication path 872 can be a network connection. Examples of such a network connection can include a local area network, wide area network, personal area network, and the Internet, among others.

As shown in FIG. 8, the machine-readable instructions stored in the memory resources 870 can be segmented into a plurality of modules 874, 876, and 878 that when executed by the processing resources 868 can perform functions. As used herein a module includes a set of instructions included to perform a particular task or action. The modules 874, 876, and 878 can be sub-modules of other modules. For example, the twist module 874 can be a sub-module of the orientation module 876, or the twist module 874 and the orientation module 876 can be contained within a single module. Furthermore, the modules 874, 876, and 878 can comprise individual modules separate and distinct from one another. Examples are not limited to the specific modules 874, 876, and 878 illustrated in FIG. 8. Although not specifically illustrated, the memory resources 870 can store (at least temporarily) output of tilt sensors and/or models that describe twist along the a portion of a towed object for operation thereon by the modules 874, 876, and 878.

Each of the modules 874, 876, and 878 can include program instructions or a combination of hardware and program instructions that, when executed by a processing resource 868, can function as a corresponding engine as described with respect to FIG. 7. For example, the twist module 874 can include program instructions or a combination of hardware and program instructions that, when executed by a processing resource 868, can function as the twist engine 760. The orientation module 876 can include program instructions or a combination of hardware and program instructions that, when executed by a processing resource 868, can function as the orientation engine 762. The calibration module 878 can include program instructions or a combination of hardware and program instructions that, when executed by a processing resource 868, can function as the calibration engine 764.

The twist module 874 can include program instructions or a combination of hardware and program instructions that, when executed by a processing resource 868, can determine an amount of twist as a function of length of a portion of a towed object based on output of a plurality of tilt sensors in the portion of the towed object and any of a plurality of models that describe the twist along the portion of the towed object. Although not specifically illustrated, the memory resources 870 can be segmented into an actuation module that can include instructions executable to actuate a plurality of steering devices coupled to the towed object to cause the particular portion to untwist according to any of the plurality of models. The orientation module 876 can include program instructions or a combination of hardware and program instructions that, when executed by a processing resource 868, can determine a respective orientation of each of the plurality of tilt sensors based on the determined amount of twist.

The calibration module 878 can include program instructions or a combination of hardware and program instructions that, when executed by a processing resource 868, can calibrate a seismic sensor coupled to the portion of the towed object based on the determined respective orientations and a portion of the sensor relative to the plurality of tilt sensors. The calibration module 878 can include instructions executable to calibrate a particular one of the plurality of tilt sensors based on the determined respective orientation of the particular tilt sensor. The calibration module 878 can include instructions executable to calibrate each of the plurality of tilt sensors based on the determined respective orientations of each of the plurality of tilt sensors.

Figure 9:
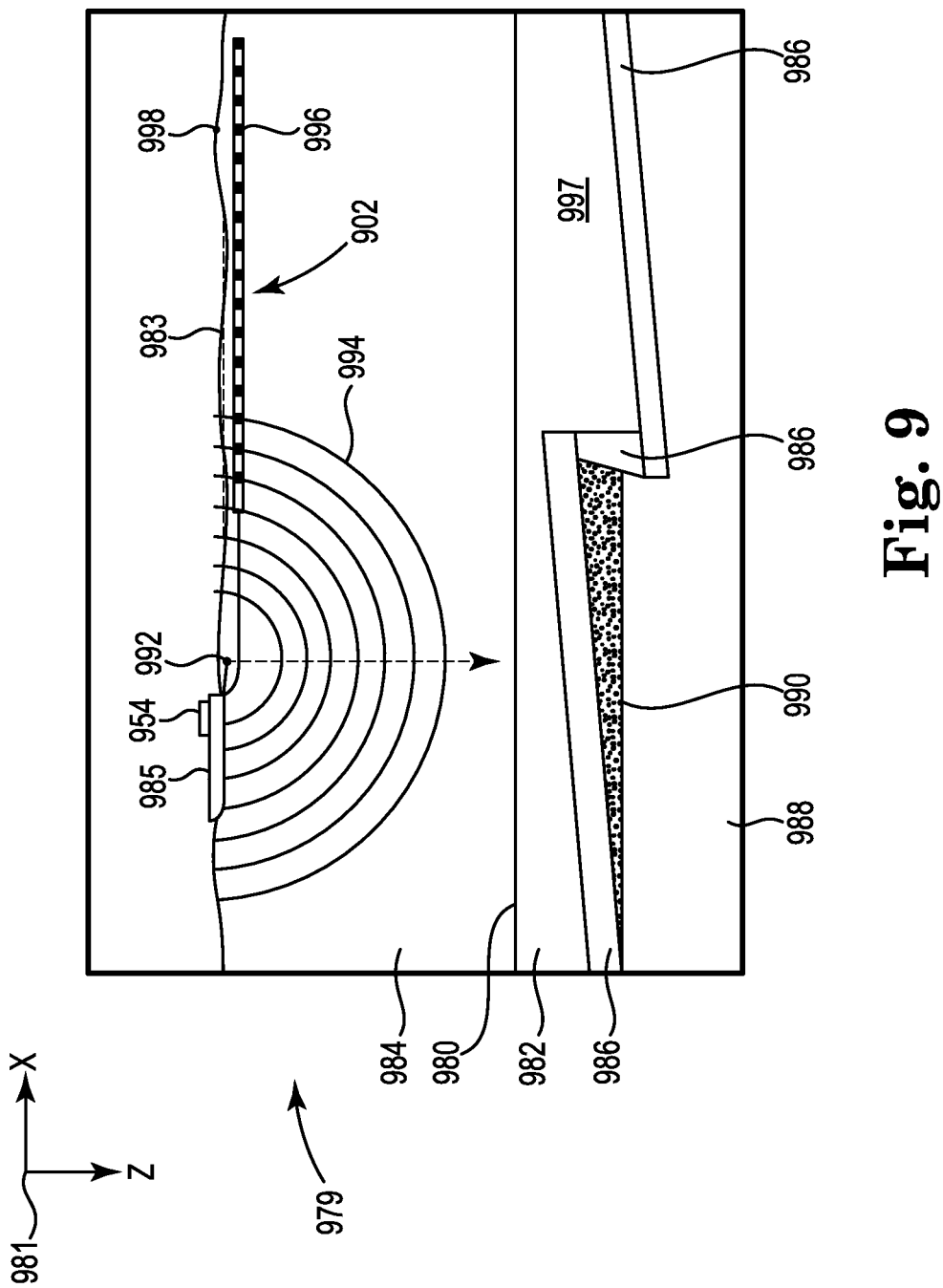
FIG. 9 illustrates a front elevation or xz-plane view of an example of marine surveying in which acoustic signals are emitted by a source for recording by sensors.

FIG. 9 illustrates a front elevation or xz-plane 981 view of an example of marine surveying in which acoustic signals are emitted by a source 992 for recording by seismic sensors 996. The recording can be used for processing and analysis in order to help characterize the structures and distributions of features and materials underlying the surface of the earth. FIG. 9 illustrates a domain volume 979 of the earth's surface comprising a subsurface volume 982 of sediment and rock below the surface 980 of the earth that, in turn, underlies a fluid volume 984 of water having a water surface 993 such as in an ocean, an inlet or bay, or a large freshwater lake. The domain volume 979 shown in FIG. 9 represents an example experimental domain for a class of marine surveys. FIG. 9 illustrates a first sediment layer 997, an uplifted rock layer 986, second, underlying rock layer 988, and hydrocarbon-saturated layer 990. One or more elements of the subsurface volume 982, such as the first sediment layer 997 and the first uplifted rock layer 986, can be an overburden for the hydrocarbon-saturated layer 990. In some instances, the overburden may include salt.

FIG. 9 shows an example of a marine survey vessel 985 equipped to carry out marine surveys. In particular, the marine survey vessel 985 can tow one or more towed objects 902 (shown as one streamer for ease of illustration) generally located below the water surface 983. The streamers can be long cables containing power and data-transmission lines (electrical, optical fiber, etc.) to which sensors may be coupled. In one type of marine survey, the seismic sensor 996 represented by the shaded disk in FIG. 9, comprises a pair of sensors including a geophone that detects particle displacement within the water by detecting particle motion variation, such as velocities or accelerations, and/or a hydrophone that detects variations in pressure. According to at least one embodiment of the present disclosure, the streamer can include a plurality of tilt sensors along a length of the streamer. The streamers and the marine survey vessel 985 can include sensing electronics and data-processing facilities that allow marine survey sensor readings to be correlated with absolute positions on the sea surface and absolute three-dimensional positions with respect to a three-dimensional coordinate system. In FIG. 9, the marine survey sensors along the streamers are shown to lie below the sea surface 983, with the marine survey sensor positions correlated with overlying surface positions, such as a surface position 998 correlated with the position of the seismic sensor 996. The marine survey vessel 985 can also tow one or more marine survey sources 992 that produce signals as the marine survey vessel 985 and streamers move across the sea surface 983. Marine survey sources 992 and/or streamers may also be towed by other vessels, or may be otherwise disposed in fluid volume 984. For example, marine survey sensors may be located on ocean bottom cables or nodes fixed at or near the surface 980, and marine survey sources 992 may also be disposed in a nearly-fixed or fixed configuration.

FIG. 9 shows source energy illustrated as an expanding, spherical signal, illustrated as semicircles of increasing radius centered at the marine survey source 992, representing a down-going wavefield 994, following a signal emitted by the marine survey source 992. The down-going wavefield 994 is, in effect, shown in a vertical plane cross section in FIG. 9. The outward and downward expanding down-going wavefield 994 may eventually reach the surface 980, at which point the outward and downward expanding down-going wavefield 994 may partially scatter, may partially reflect back toward the streamers, and may partially refract downward into the subsurface volume 982, becoming elastic signals within the subsurface volume 982.

The towed object 902 can be coupled to a controller 954 onboard the marine survey vessel 985. The coupling between the controller 954 and the towed object 902 for communication purposes can be wired or wireless. For example, electrical or optical cabling can run along or within the towed object 902 and be coupled to towed object telemetry units (not specifically illustrated in FIG. 9) on the towed object 902 and the steering devices (not specifically illustrated in FIG. 9) as well as the controller 954. The cabling can also be coupled to the tilt sensors (e.g., via being coupled to the towed object telemetry units). The controller 954 can control operation of the steering devices, receive data from the tilt sensors, and calibrate the seismic sensor 996.

In accordance with at least one embodiment of the present disclosure, a geophysical data product may be produced. Geophysical data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method, comprising:
    determining an amount of twist as a function of length along a length of a portion of a towed object based on outputs of a plurality of tilt sensors disposed at respective positions along the length of the portion of the towed object and a model that describes the twist along the length of the portion of the towed object, wherein determining the amount of twist based on the outputs and the model comprises performing a regression analysis on the outputs and respective positions of three or more of the plurality of tilt sensors; and
    determining an orientation of a seismic sensor in the portion of the towed object based on the determined amount of twist and a position of the seismic sensor along the length of the portion of the towed object.

2. The method of claim 1, further comprising correcting an output of the seismic sensor based on the determined orientation such that the corrected output is in a world frame of reference.

3. The method of claim 1, wherein performing the regression analysis comprises performing a linear regression analysis in response to the model comprising a linear model.

4. The method of claim 1, wherein performing the regression analysis comprises performing a non-linear regression analysis in response to the model comprising a non-linear model.

5. The method of claim 1, wherein the method further includes determining a respective orientation of each of the plurality of tilt sensors based on the determined amount of twist and a respective position of each of the plurality of tilt sensors along the length of the portion of the towed object.

6. The method of claim 1, wherein the method further includes determining amounts of twist as a function of length along lengths of each of a plurality of portions of the towed object based on outputs of a respective plurality of tilt sensors in each of the lengths of the plurality of portions of the towed object and on respective models that describe the twists along the lengths of the plurality of portions of the towed object.

7. The method of claim 1, wherein the method further includes determining an amount of twist as a function of length of a different portion of the towed object based on outputs of a different plurality of tilt sensors in the different portion of the towed object and a different model that describes the twist along the different portion of the towed object.

8. A system, comprising:
    a streamer including a plurality of portions;
    a first steering device coupled to a first end of a particular portion;
    a second steering device coupled to a second end of the particular portion;
    a plurality of tilt sensors disposed at respective positions along a length of the particular portion;
    a seismic sensor coupled to the particular portion; and
    a controller coupled to the streamer and to the first and the second steering devices, wherein the controller is configured to:
        receive outputs of the plurality of tilt sensors;
        determine an amount of twist as a function of length along the length of the particular portion based on the outputs and a model that describes twist along the particular portion, wherein determining the amount of twist based on the outputs and the model comprises performing a regression analysis on the outputs and respective positions of three or more of the plurality of tilt sensors; and
        determine an orientation of the seismic sensor based on a position of the seismic sensor along the length of the particular portion and the determined amount of twist.

9. The system of claim 8, wherein the controller is further configured to correct an output of the seismic sensor based on the determined orientation such that the corrected output is in a world frame of reference.

10. The system of claim 8, wherein the seismic sensor comprises a geophone that is not gimballed.

11. The system of claim 10,
    wherein the system includes a plurality of seismic sensors; and
    wherein at least one of the plurality of seismic sensors comprises a piezoelectric accelerometer.

12. The system of claim 8, wherein the plurality of tilt sensors are coupled to the particular portion along a fixed reference.

13. The system of claim 12, wherein the seismic sensor is coupled to the particular portion along the fixed reference.

14. The system of claim 8, wherein the plurality of tilt sensors are coupled to the particular portion at uniform intervals.

15. The system of claim 8, wherein the plurality of tilt sensors are coupled to the particular portion at non-uniform intervals.

16. The system of claim 8, wherein the controller stores a plurality of models that each describe a different twist along the particular portion.

17. The system of claim 8, further comprising:
    a respective plurality of tilt sensors coupled to each of the plurality of portions;
    a respective first steering device coupled to the controller and to a respective first end of each of the plurality of portions;
    a respective second steering device coupled the controller and to a respective second end of each of the plurality of portions;
    wherein the controller is further configured to:

receive output of the respective pluralities of tilt sensors;

determine a respective amount of twist as a function of length of each of the plurality of portions based on the output and a respective model that describes twist along a respective one of the plurality of portions;

determine an orientation of each of the tilt sensors based on the determined amount of twist; and calibrate each of the tilt sensors based on the orientation.

18. The system of claim 8, wherein the controller is configured to actuate the first and the second steering devices to cause the particular portion to untwist according to the model.

19. The system of claim 8, wherein the controller is configured to actuate the first and the second steering devices to cause the particular portion to rotate to calibrate the plurality of tilt sensors.

20. A non-transitory machine-readable medium storing instructions executable by a processing resource to:

determine an amount of twist as a function of length along a length of a portion of a towed object based on outputs of a plurality of tilt sensors disposed at respective positions along the length of the portion of the towed object and any one of a plurality of models that describe the twist along the length of the portion of the towed object, wherein determining the amount of twist based on the outputs and the one of the plurality of models comprises performing a regression analysis on the outputs and respective positions of three or more of the plurality of tilt sensors; and determine an orientation of a seismic sensor in the portion of the towed object based on the determined amount of twist and a position of the seismic sensor along the length of the portion of the towed object.

21. The medium of claim 20, wherein the instructions are further executable to:

determine a respective orientation of a particular one of the plurality of tilt sensors based on the determined amount of twist and a position of the particular tilt sensor along the length of the towed object; and calibrate the particular tilt sensor based on the determined respective orientation of the particular tilt sensor.

22. The medium of claim 20, wherein the instructions are further executable to:

determine respective orientations of each of the plurality of tilt sensors based on the determined amount of twist and respective positions of the tilt sensors along the length of the towed object; and calibrate each of the plurality of tilt sensors based on the determined respective orientations of each of the plurality of tilt sensors.

23. The medium of claim 20, wherein the instructions are executable to actuate a plurality of steering devices coupled to the towed object to cause the particular portion to untwist according to the determined amount of twist.

24. The medium of claim 20, wherein the instructions are further executable to correct an output of the seismic sensor based on the determined orientation such that the corrected output is in a world frame of reference.

\* \* \* \* \*